US007343079B2

(12) United States Patent
Bierhoff

(10) Patent No.: US 7,343,079 B2
(45) Date of Patent: Mar. 11, 2008

(54) RAY TRACING IN DISCONTINUOUS MULTIMODE CHANNEL WAVEGUIDES

(75) Inventor: Thomas Bierhoff, Volkmarsen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/565,674

(22) PCT Filed: Jul. 23, 2004

(86) PCT No.: PCT/EP2004/051590

§ 371 (c)(1),
(2), (4) Date: May 30, 2006

(87) PCT Pub. No.: WO2005/010579

PCT Pub. Date: Feb. 3, 2005

(65) Prior Publication Data

US 2006/0275015 A1    Dec. 7, 2006

(30) Foreign Application Priority Data

Jul. 25, 2003    (DE) ............................. 103 34 107

(51) Int. Cl.
*G02B 6/10* (2006.01)
*G02B 6/04* (2006.01)
*G02B 6/00* (2006.01)

(52) U.S. Cl. ..................... 385/146; 385/121; 385/147

(58) Field of Classification Search ........ 385/146–147, 385/121
See application file for complete search history.

(56) References Cited

U.S. PATENT DOCUMENTS 7,046,908 B2 * 5/2006 Bierhoff et al. ............. 385/147

FOREIGN PATENT DOCUMENTS

| DE | 10051405 C2 | 5/2002 |
|----|----|----|
| WO | WO 02 33455 A2 | 4/2002 |
| WO | WO 02/33455 A3 * | 4/2002 |

OTHER PUBLICATIONS

NJ Cronin, "Microwave and Optical Waveguides," 1995, Institute of Physics Publishing, pp. 27-33.*
Chai Yeh, "Handbook of Fiber Optics Theory and Applications," 1990, Academic Press, Inc., pp. 55-56.*
E. Griese et al.:"Time domain simulation of optical multimode chip-to-chip interconnects" Proceedings of SPIE, vol. 4455, Dec. 2001, pp. 131-142, XP002304825, paragraph 0002, pictures 5-17.

(Continued)

*Primary Examiner*—Hemang Sanghavi
*Assistant Examiner*—Kajli Prince
(74) *Attorney, Agent, or Firm*—Bell, Boyd & Lloyd LLP

(57) ABSTRACT

The invention relates to a method for determining the transmission behaviour of an optical waveguide with a step index profile, wherein the optical waveguide is composed of guide pieces, protruding into each other, so that the surfaces of said guide pieces comprise real and virtual surfaces, lying respectively outside and inside another guide piece. The transmission behaviour is determined by geometric ray tracing, wherein the points of intersection of a ray with the surfaces of the guide pieces are determined, which are thus defined analytically, in particular, by extrusion of cross sections along an axial trajectory. A real material transition can be determined by an iterative procedure.

6 Claims, 2 Drawing Sheets

OTHER PUBLICATIONS

E: Czech: "Spatial distribution of luminance of light emitted by optical fibers", Proceedings of SPIE, vol. 5064, Apr. 2003, pp. 222-229, CP002304826, paragraph 0001-0005, pictures 1-5.

Bierhoff T. et al: "Ray Tracing Technique and its verification for the analysis of highly multimode optical waveguides with rough surfaces"; IEEE Transactions on Magnetics, IEEE Inc. New York, US, vol. 37, No. 5, Part 1 9 (2001) pp. 3307-3310, XP 001089831, ISSN: 0018-9464, completed document.

Bierhoff T. et al: "An approach to model wave propagation in highly multimode optical waveguides with rough surfaces" International symposium on Theoretical electrical engineering, XX, XX, Sep. 6, 1999, pp. 515-520, XP008005522, completed document.

* cited by examiner

RAY TRACING IN DISCONTINUOUS MULTIMODE CHANNEL WAVEGUIDES

CLAIM FOR PRIORITY

This application is a national stage of PCT/EP2004/051590 which was published on Feb. 3, 2005 and which claims the benefit of priority to German Application No. 10334107.2 filed Jul. 25, 2003.

TECHNICAL FIELD OF THE INVENTION

The invention relates to ray tracing in highly multimode channel waveguides.

BACKGROUND OF THE INVENTION

Previously optical wave analysis methods such as the Finite Element Method (FEM) or the 'Beam Propagation Method' (BPM) have been available for calculating ray propagation in dielectric channel waveguides, especially optical waveguides. However these methods can only be used efficiently if only one mode or a few modes are to be taken into account and the cross-section of the waveguide, relative to the optical wavelength, is not too big.

For multimode step index waveguides, in which the cross-section is significantly greater than the wavelength of the radiation used, efficient ray tracing based on geometrical optics is possible on the other hand.

In this case (in the simulation) a single ray of predetermined direction and polarization is coupled into the waveguide. This exits either directly at the end of the waveguide or is reflected on the wall of the optical channel, i.e. the wall surface of the index jump. This simulation is performed for a plurality of rays of different direction entering the waveguide. An example of this type is to be found in patent application DE 10051405 C2.

In this case the problem lies in determining the relevant reflection point. For simple geometrical forms, especially cuboids, this is easily possible, since the intersection point of a straight line with a plane is easy to calculate analytically. This is performed for the planes corresponding the side surfaces of the cuboid and that point which lies on the surface of the cuboid is used. This means however that only waveguides with a rectangular cross-section can be computed. This method is possible whenever there is a convex body with a surface which can be described analytically. However this is no longer the case for a curved waveguide.

To make curved waveguides with other cross sections accessible to computational determination, the waveguide is modeled as an extrusion of the cross-sectional surface, as for example in the Article by Th. Bierhoff and A. Himmler, "Modeling of board-integrated step index waveguides for advanced ray tracing analysis", Proc. Optics in Computing Technologies, 33106 Paderborn 2001, P. 37-43. The cross-section is convex in this case; the extrusion along a curved trajectory however is no longer convex.

In practice even this method is not sufficient. The coupling of two waveguides by a molded material in particular produces a complex volume which can no longer be handled in the way mentioned. The same applies to the coupling-in points of waveguides. In this case concave areas with edges extending into them are produced in particular.

SUMMARY OF THE INVENTION

The invention discloses a method with which the passage of a ray in waveguides with complex space volumes can be determined.

In one embodiment of the invention, there is a method for determination of transmission behavior of an optical waveguide by ray tracing, comprising undertaking a spatial representation of the optical waveguide as spatial combination of two or more guide pieces with an analytically representable surface, for which in each case an analytical method for determination of intersection points of a spatial straight line with the surface is produced; and determining the transmission behavior by the ray tracing of a test ray, intersection points of the test ray with the surface of the guide pieces until such time as an intersection point is found which belongs to a real material transition.

In one aspect of the invention, there is a determination as to whether a real material transition is present comprises initially determining intersection points of the test ray with the surfaces of guide pieces; sorting the intersection points in ascending order of ray direction and investigated in the order, starting from an origin; if the origin is located outside the optical waveguide, finding the first intersection point as one with a real material transition; if the origin is not located outside the optical waveguide, the angle between a normal to the surface of an associated waveguide section and ray direction is used to determine whether an entry or exit is present in the guide piece; and determining a real material transition is present if an intersection point is reached in which, for each entry in a part piece, an exit has also occurred with predetermined entries initially being set in accordance with the position of the origin.

In another aspect of the invention, there is a determination as to whether a real material transition is present comprises initially determining intersection points of the test ray with the surfaces of guide pieces; sorting the interfaces in ascending order of ray direction and investigated in the order, starting from an origin; if the origin is located outside the optical waveguide, finding the first intersection point as one with a real material transition; If the origin is not located outside the optical waveguide, for each intersection point one further test point in each case in a direction of the ray and opposite to a direction of the ray is investigated as to whether it lies inside one of the part pieces; if the result is different for the two test points, a material transition is present.

In still another aspect of the invention, there is a determination as to whether a real material transition is present comprising determining successively, for the guide pieces intersection points of the test ray with the surface of the guide piece, and investigated with the subsequent steps; determining, for each intersection point one test point in each case in a same direction and in an opposite direction to the ray, with a small predetermined distance from the intersection point; and investigating each of the test points to see whether it lies inside one of the part pieces; if the result is different for the two test points, a material transition is present.

In yet another aspect of the invention, normals to the surface are used to determine the direction in which there is an exit from the part piece and a test point is determined in the direction; if it does not lie within another guide piece, a material transition is present.

In another aspect of the invention, there is determination as to whether a real material transition is present comprising initially determining intersection points of the test ray with the surfaces of guide pieces are determined; sorting the interfaces in ascending order of ray direction and investigated in order, starting from an origin; and determining, for each intersection point, whether it lies inside one of the other part pieces; if not the case, a material transition is present.

In another embodiment of the invention, there is a device for simulation of optical waveguides, where the device performs the following undertaking a spatial representation of the optical waveguide as spatial combination of two or more guide pieces with an analytically representable surface, for which in each case an analytical method for determination of intersection points of a spatial straight line with the surface is produced; and determining the transmission behavior by the ray tracing of a test ray, intersection points of the test ray with the surface of the guide pieces until such time as an intersection point is found which belongs to a real material transition.

BRIEF DESCRIPTION OF THE DRAWINGS

The drawings are described in more detail below with reference to the exemplary embodiments and figures, in which.

DETAILED DESCRIPTION OF THE INVENTION

Figure 1:
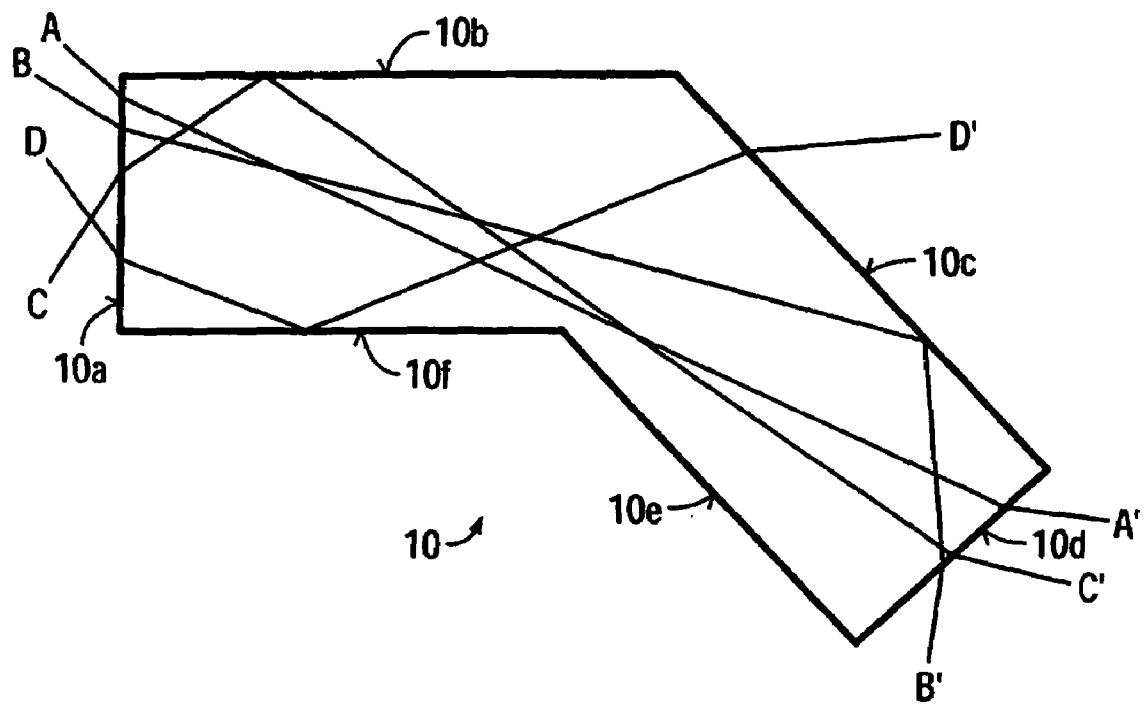
FIG. 1 shows a longitudinal section of an optical waveguide.

FIG. 1 shows a longitudinal section for such a case. The optical waveguide 10 is angled and typically rectangular in the cross-section at right angles to the plane of the drawing. The wall surfaces 10a and 10d are the entry or exit surfaces at which refraction predominantly occurs on entry or exit of the rays. On the wall surfaces 10b, 10c, 10e and 10f the reflection of the rays is to predominate, in order to obtain wave guidance. A few of the possible ray passages are shown by the ray paths A, B, C and D. In the drawing the refractions on entry and exit are indicated in each case.

Ray A is not reflected; it travels completely within the waveguide 10 without touching one of the wall surfaces. Ray B is reflected in the right-hand part of the wall surface 10c. Ray C is reflected in the left-hand part of the wall surface 10b. Ray D is initially reflected in the left-hand part of the wall surface 10f and then in the right-hand part hits the wall surface 10c. Since the angle of incidence is acute no total reflection occurs; the ray leaves the optical waveguide as loss.

Figure 2:
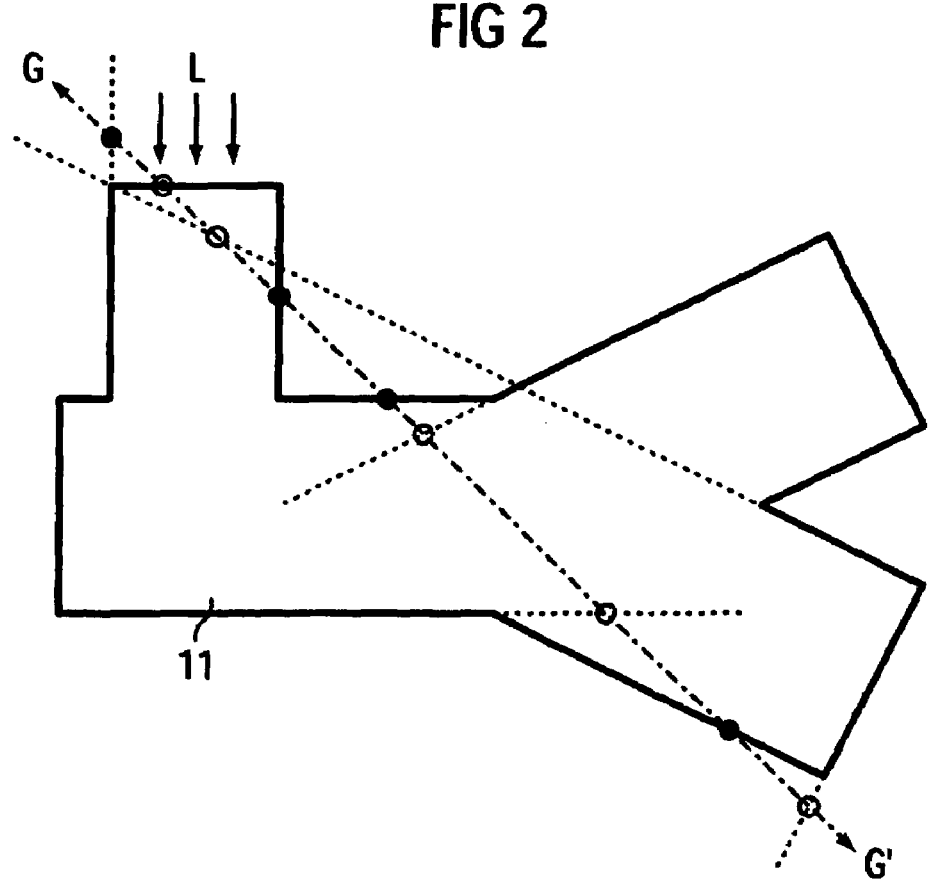
FIG. 2 shows a longitudinal section through an optical waveguide 11 with internal edges and thereby locally concave areas.

FIG. 2 shows a longitudinal section through an optical waveguide 11 with internal edges and thereby locally concave areas. It is to be assumed for the sake of clarity that the cross sections at right angles to the plane of the drawings are rectangular. The structure shown in FIG. 2 can then be simply defined by specifying the twenty six corner points in the space. The waveguide has thirteen wall surfaces which are at right angles to the plane of the drawing in FIG. 2 and two surfaces corresponding to the visible cross-section. The latter are not only not rectangles but are also not convex. Fourteen planes are produced in the space on which the wall surfaces lie. The extrusion method described above is not applicable for two reasons: This method looks at light rays which approximately follow the trajectory and requires convex cross sections.

A solution in accordance with the ray tracing method uses a straight line in the space at which the beginning of the ray lies. This is shown in FIG. 2 by the line G-G', with the points of intersection of this straight line with all fifteen planes being indicated; in the example a few of these points are marked. If the ray does not coincidentally run parallel to a plane, this produces thirteen points of intersection with the planes of the wall surfaces. From each of the intersection points it is determined whether it lies on one of the wall surfaces. For the rectangular side surfaces this is relatively simple; for the non-convex ceiling surfaces this is no longer a simple matter. These intersection points all lie on the straight line G-G', which represents the ray of light. Which of these points lies on one of the wall surfaces is then determined. The non-solid (and not shown further) points are thus omitted. There remain the four points marked with solid circles of which the point with the circular border in the example is the start point. The next point (in the predetermined direction) is the intersection point of the light ray for which reflection or exit with diffraction can now be determined and is the start point for the new application of the method.

Apart from the effort involved in the calculation with the increasing number of surfaces the intersection point with the floor or ceiling plane is still easy to find; however effort is involved in determining whether this point lies within the complex polygon which surrounds the ceiling and floor surface.

The invention solves the problem of determining an exit point by dispensing with the explicit description of the actual wall surfaces. The optical waveguide is represented as a spatial combination of two or more pieces of the same core material. Through the use of simple basic models, generally cuboids, simple modeling is possible. For example, the intersection points of a straight line representing the ray of light can be determined efficiently for cuboids. By contrast with the method presented previously, the intersection points lying on the inside are not determined by whether they lie on a real wall surface; instead it is determined whether a media transition is present.

FIG. 3 shows, again as a longitudinal section, how the optical waveguide 11 is presented as the spatial combination of four pieces 11a, 11b, 11c and 11d, which for reasons of clarity could have rectangular or circular longitudinal sections in this example. In the simplest case cuboids or cylinders are thus involved; in general however it involves the extrusions mentioned above.

A method for determination of the transmission behavior of an optical waveguide with a step index profile is thus involved, in which the optical waveguide is imagined to include guide pieces protruding into each other with the same core material, so that the surfaces of these guide pieces consist of real surfaces lying outside and virtual surfaces lying inside another guide piece. The transmission behavior is determined with geometrical ray tracing, in that the intersection points of a ray are determined with the surfaces of the guide pieces which for this reason are defined analytically, especially through extrusion of cross sections along an axial trajectory. An iterative method allows a real material transition to be determined.

Figure 4:
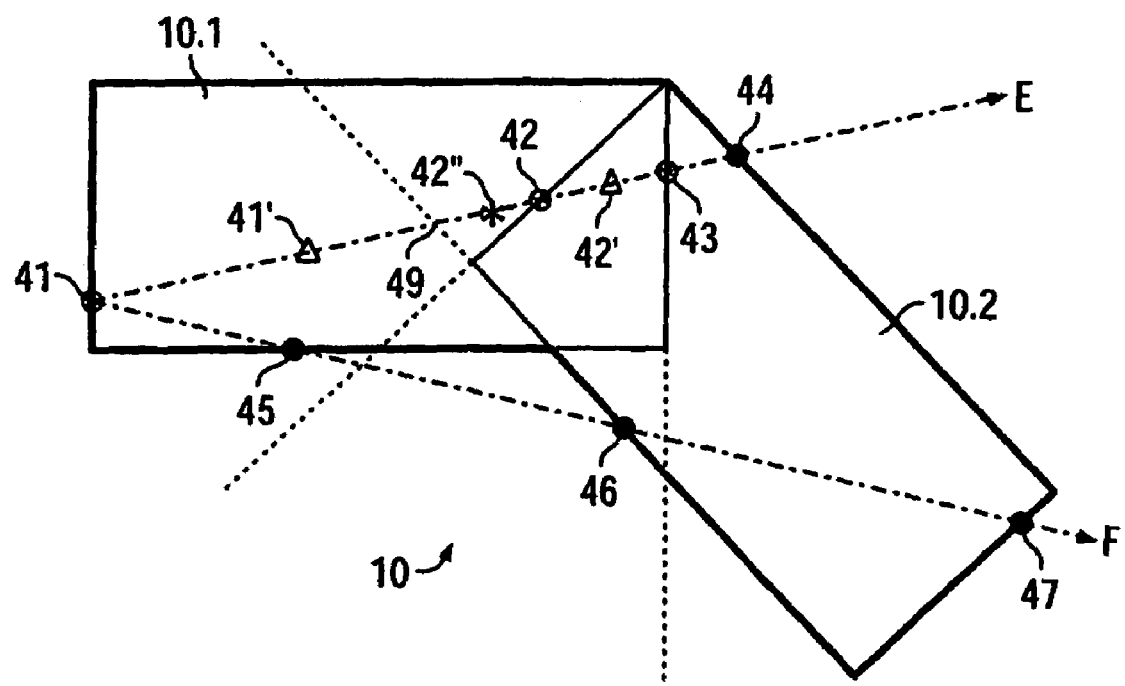
FIG. 4 shows another embodiment of the waveguide illustrated in FIG. 1.

To explain the method, the simpler form of an optical waveguide 10 used in FIG. 1 is shown in FIG. 4 as consisting of a combination of two guide pieces 10.1 and 10.2 with the same core material.

The ray E begins at start point 41 (or arrives here from the environment). The intersection points of the ray E (i.e. the associated straight line) with the part pieces are now calculated. Other intersection points with the extensions of the surfaces, such as the intersection point 49 not marked any further are omitted from the calculation of the intersection points with part piece 10.2. Two points 41 and 44 and also 42 and 43 are produced. Point 41 is the starting point. The next point is point 42 which lies inside the optical waveguide however, i.e. is not the exit point 44 sought.

The invention uses the knowledge that point 42 is not an exit point or that no diffraction occurs at this point since the materials on both sides of the point 42 are (optically) the same.

To find out whether the materials on both sides are the same, the invention provides different embodiments and variants.

For the preferred embodiment use is made of the fact that for calculation of refraction or reflection the normal to the surface at the entry point must be defined in any event. It only has to be ensured for geometrical modeling that this normal to the surface systematically always points outwards (or always inwards). This is the case when normal 3D modeling method is used. Then the angle between the ray E and the normal to the surface of part piece 10.2 is calculated for point 42. If this lies in the first or fourth quadrant, a ray entry is present for example in part piece 10.2, otherwise a ray exit.

After It has been determined in this way whether a ray entry or exit was present a counter assigned to the part piece 10.2 is incremented or decremented by one. Each part piece is assigned such a counter. Since the origin is an entry point in the part piece 10.1 this counter is preset to one Now the two counters are not zero so that the ray is still located in the interior.

At point 43 a ray exit from part piece 10.1 is established in the same way for which the counter is reduced and thereby becomes zero. Since however the counter of section 10.2 is still a not at zero point 43 is not an edge point.

With point 44 a ray exit from part piece 10.2 is determined and its counter is reduced. Now all counters are zero; thus a real exit from the modeled optical waveguide is present.

The counter for the part pieces must always comprise more than one bit when the part pieces are not convex since then a ray could enter and leave multiple times.

Instead of counters a list of the part pieces can also be maintained; on entry the part piece is inserted into the list, on exit (any) entry for the part piece concerned is removed. The exit point is reached if the list is empty. It is also possible to determine in this way whether an intersection point is reached for which, for each entry into a part piece an exit has also occurred.

In this case the counters or the list are to be preset in accordance with the origin. In the general case the guide pieces are defined in which the origin is located and accordingly the counters for these guide pieces are set to one or the guide pieces are entered into the list. If the origin of lies outside, the first point in the direction of the ray is always a real entry point; this case must be dealt with beforehand if necessary. In the current method the point of origin always lies on a real outside wall of a specific guide piece; here only the counter for this waveguide section has to be set or this guide piece entered in the list. Only in the general case in which the origin is located in the inside of the optical waveguide are all suitable guide pieces to be determined.

Otherwise the last point 44 is always an exit point; this fact can optionally be used for optimizing the plausibility checking.

Figure 3:
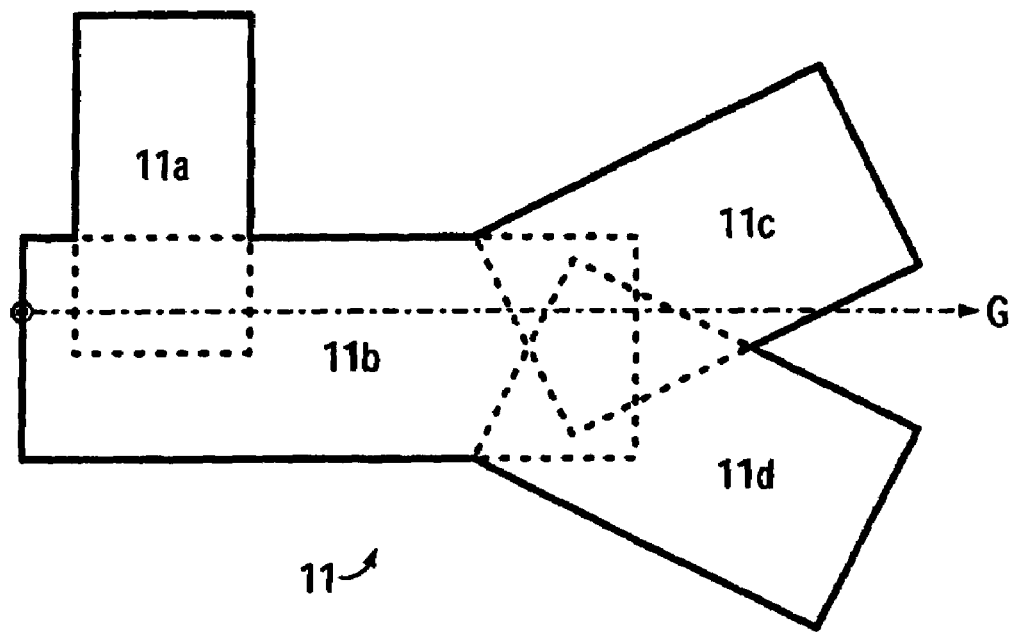
FIG. 3 shows a longitudinal section of the optical waveguide in another embodiment.

In FIG. 3 the ray G is shown for comparison. The following sequence is produced here: "Entry 11$a$", "exit 11$a$", "entry 11$c$", "entry 11$d$", "exit 11$b$", "exit 11$d$", "exit 11$c$" and at the last point simultaneously "exit 11$c$".

The second embodiment needs a method to determine for any given point whether it is inside at least one part piece. A simple solution for a cuboid consists of defining the distances of the point in question from the planes of the side surfaces. These distances must be smaller in each case than the distance between the side surface and the opposite side surface.

With the first variant of these two embodiments a point 41' is determined between point 41 and point 42, at its simplest as the center point. This point is examined to see if it lies inside at least one part piece. The same is done with the point 42' between point 42 and the next point 43. If the two points are inside at least one part piece no material transition is present; the point 42 is an internal point. When applied to point 43 the point 42' assumes the role of the previous point 41', so that it is only necessary to determine for the next center point between 43 and 44 whether it lies inside a part piece. With point 44 this test is superfluous since no further point is present and thus point 44 is always an exit point. Since furthermore it is known because of the calculations of point 41 that a ray entry is present here, this information can serve instead of an actual investigation of point 41'. In the example it is also only necessary for point 42, to determine whether point 42' lies inside at least one part piece. Accordingly for point 43 only a point on the subsequent path is to be investigated.

The example of ray F in FIG. 4 shows that the point 45 is a real exit point since it leaves the part piece 10.1 and thereby the counter for part piece 10.1 becomes zero or the list of the part pieces has become empty.

With another variant it is not necessary to define all points of intersection with the surfaces of the part pieces in beforehand and to then process these in sorted form. Instead on the one hand the direction of the ray in which the material of the part piece is located is defined with the aid of the normal to the surface. For an entry this is in the direction of the ray, for an exit it is against the ray direction. In the example of point 42 in FIG. 4 it is an entry; thus the material of the current part piece is located in the direction of the ray. Now a point 42" is used opposite to this direction which is a predetermined short distance away from the surface. The distance c will be as small as possible, but chosen so that rounding errors still do not play a part for the following calculation. From this point it is now determined whether it is inside one or the other of the part pieces. If this is the case, there is no material transition present; the method is continued with the next part piece. If this is not the case an exit point is found. The sequence in which the part pieces are tested is usefully designed so that the test begins with the sections which have last shown a coincidence ('least recently used', LRU strategy).

The preferred aspect of this embodiment initially determines all intersection points of a test ray with the surfaces of the part pieces, sorts these according to distance and then tests them in the sequence thus produced. A check is performed here as to whether the intersection point additionally lies within a further part piece. If this is the case, e.g. for points 42 and 43 in FIG. 4, then there is no material transition present. If this is not the case, e.g. for points 45, 46 and 44 in FIG. 4, a material transition is present. The special case of points which belong to a plurality of surfaces of part pieces can easily be handled in this way. With suitable execution the sorting generates for each point at the same time a list of the part pieces to which this point belongs; this list includes one element in the normal case of no coincidences required above. Only the part pieces not contained in the list are tested; here the point either lies completely inside or outside.

This embodiment can be advantageous if the determination whether a point lies within a part piece is not more expensive in computing terms than the determination of the point of intersection of a ray with the surface of a part piece.

A ray can theoretically hit an edge or a corner rather than a surface. This is, however, a known problem of ray tracing, which can as a rule be ignored as long as the formulae used do not exhibit any singularities. This also relates to the case in which more than two side surfaces of the part pieces coincide. If the side surfaces are not coplanar, a virtual edge or corner is involved which in the same way as a real edge is virtually without meaning. There remains the case of two side surfaces being in the same plane and being the same at least in sections. In practice this case will seldom occur and is intuitively avoided by modelers. If necessary a warning can be output and the user requested to change the model. A simple solution consists of moving the two questionable points for the duration of the calculation by an amount of the numerical precision limit to be provided in any event in the opposite direction and continuing the calculations with the changed points.

To avoid these problems in advance the optical waveguide is preferably divided up in such a way that the part pieces do not have any common surfaces.

What is claimed is:

1. A method for determination of transmission behavior of an optical waveguide by ray tracing, comprising:
   undertaking a spatial representation of the optical waveguide as an overlapping spatial combination of two or more guide pieces with an analytically representable surface, for which in each case an analytical method for determination of intersection points of a spatial straight line with the surface is produced; and
   determining the transmission behavior by the ray tracing of a test ray, intersection points of the test ray with the surface of the guide pieces until such time as an intersection point is found which belongs to a real material transition.

2. The method according to claim 1, wherein the determination as to whether a real material transition is present comprises:
   initially determining intersection points of the test ray with the surfaces of guide pieces;
   sorting the intersection points in ascending order of ray direction and investigated in the order, starting from an origin;
   if the origin is located outside the optical waveguide, finding the first intersection point as one with a real material transition;
   if the origin is not located outside the optical waveguide, the angle between a normal to the surface of an associated waveguide section and ray direction is used to determine whether an entry or exit is present in the guide piece; and
   determining a real material transition is present if an intersection point is reached in which, for each entry in a part piece, an exit has also occurred with predetermined entries initially being set in accordance with the position of the origin.

3. The method according to claim 1, wherein the determination as to whether a real material transition is present comprises:
   initially determining intersection points of the test ray with the surfaces of guide pieces;
   sorting the interfaces in ascending order of ray direction and investigated in the order, starting from an origin;
   if the origin is located outside the optical waveguide, finding the first intersection point as one with a real material transition;
   if the origin is not located outside the optical waveguide, for each intersection point one further test point in each case in a direction of the ray and opposite to a direction of the ray is investigated as to whether it lies inside one of the part pieces; if the result is different for the two test points, a material transition is present.

4. The method according to claim 1, wherein the determination as to whether a real material transition is present comprising:
   determining successively, for the guide pieces intersection points of the test ray with the surface of the guide piece, and investigated with the subsequent steps;
   determining, for each intersection point one test point in each case in a same direction and in an opposite direction to the ray, with a small predetermined distance from the intersection point; and
   investigating each of the test points to see whether it lies inside one of the part pieces; if the result is different for the two test points, a material transition is present.

5. The method according to claim 3, wherein
   normals to the surface are used to determine the direction in which there is an exit from the part piece and a test point is determined in the direction; if it does not lie within another guide piece, a material transition is present.

6. The method according to claim 1, with the determination as to whether a real material transition is present comprising:
   initially determining intersection points of the test ray with the surfaces of guide pieces are determined;
   sorting the interfaces in ascending order of ray direction and investigated in order, starting from an origin; and
   determining, for each intersection point, whether it lies inside one of the other part pieces; if not the case, a material transition is present.

* * * * *